(12) United States Patent
Jarvis et al.

(10) Patent No.: US 12,271,434 B2
(45) Date of Patent: Apr. 8, 2025

(54) TECHNIQUES FOR CROWDSOURCED METADATA

(71) Applicant: Capital One Services, LLC, McLean, VA (US)

(72) Inventors: Daniel Jarvis, Vienna, VA (US); Jiawei Zhao, Ashburn, VA (US); Robert Chen, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 104 days.

(21) Appl. No.: 18/076,548

(22) Filed: Dec. 7, 2022

(65) Prior Publication Data
US 2023/0098802 A1    Mar. 30, 2023

Related U.S. Application Data

(63) Continuation of application No. 15/930,772, filed on May 13, 2020, now Pat. No. 11,550,866.

(51) Int. Cl.
| | |
|---|---|
| *G06F 16/951* | (2019.01) |
| *G06F 9/451* | (2018.01) |
| *G06F 16/23* | (2019.01) |
| *G06F 16/9535* | (2019.01) |
| *G06F 16/955* | (2019.01) |

(52) U.S. Cl.
CPC ............ *G06F 16/955* (2019.01); *G06F 9/451* (2018.02); *G06F 16/2379* (2019.01); *G06F 16/951* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 2002/0099679 A1* | 7/2002 | Usitalo | ............... G06N 5/00 706/46 |
| 2018/0077092 A1* | 3/2018 | Jalil | ............... G06Q 10/101 |

* cited by examiner

*Primary Examiner* — Eddy Cheung
(74) *Attorney, Agent, or Firm* — KDW Firm PLLC

(57) ABSTRACT

Various embodiments are generally directed to techniques for crowdsourcing metadata, such as to create, maintain, utilize, and/or communicate metadata in a datastore. Some embodiments are particularly directed to collecting, managing, and/or distributing metadata via a user interface application (UIA), or an extension thereof. Many embodiments may facilitate collaborative creation of a repository for metadata, such as notes, characteristics, and/or statistics corresponding to data viewed with the user interface application. For example, the comments regarding websites may be collected from a first user via a first instantiation of the web browser extension and distributed to a second user via a second instantiation of the web browser extension. In several embodiments, the metadata may be collected and managed with instantiations of the web browser extension (herein after "WBE instants") and a data manager may create, maintain, utilize, and/or communicate metadata in a datastore.

20 Claims, 9 Drawing Sheets

100

500A

500B

500C

600

700

TECHNIQUES FOR CROWDSOURCED METADATA

CROSS- REFERENCE TO RELATED APPLICATIONS

This application is a continuation of U.S. application Ser. No. 15/930,772, filed on May 13, 2020, the disclosure of which is incorporated herein by referenced in its entirety.

BACKGROUND

Generally, metadata may refer to data that provides information about other data. Different types of metadata can include descriptive, structural, administrative, reference, and statistical metadata. Descriptive metadata is descriptive information about a resource. It is used for discovery and identification. It includes elements such as title, abstract, author, and keywords. Structural metadata is metadata about containers of data and indicates how compound objects are put together, for example, how pages are ordered to form chapters. It describes the types, versions, relationships and other characteristics of digital materials. Administrative metadata is information to help manage a resource, like resource type, permissions, and when and how it was created. Reference metadata is information about the contents and quality of statistical data. Statistical metadata, also called process data, may describe processes that collect, process, or produce statistical data.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising a processor and memory comprising instructions that when executed by the processor cause the processor to perform operations comprising one or more of: identify collected metadata received from a user interface application (UIA) extension, the collected metadata based on an informational resource (IR) accessed by a UIA comprising the UIA extension and the collected metadata to indicate one or more activities of the UIA with respect to the IR; filter the collected metadata based on one or more settings of a data manager to create IR metadata; determine an IR data bucket corresponding to the IR accessed by the UIA is absent from a datastore comprising a plurality of IR data buckets and each of the plurality of IR data buckets corresponding to a unique IR; create the IR data bucket corresponding to the IR accessed by the UIA in the datastore based on absence of the IR data bucket corresponding to the IR from the datastore; store at least a portion of the IR metadata in the IR data bucket corresponding to the IR; identify one or more of the plurality of IR data buckets in the datastore correlated with the IR data bucket corresponding to the IR; and generate provided metadata for communication to the UIA extension, the provided metadata for communication to the UIA extension including an indication of the correlation between the IR data bucket and the one or more of the plurality of IR data buckets in the datastore. In many embodiments, the UIA may comprise a web browser, the IR may comprise a website, and the collected metadata may indicate one or more interactions of the web browser with the website. In several embodiments, the memory may comprise instructions that when executed by the processor cause the processor to identify manual metadata received from the UIA extension, wherein the manual metadata includes information regarding the IR input by a user of the UIA; and filter the manual metadata and the collected metadata based on one or more settings of the data manager to create IR metadata. In various embodiments, the memory may comprise instructions that when executed by the processor cause the processor to generate a metadata request for communication to the UIA extension based on the collected metadata, the metadata request to cause the UIA to prompt a user for manual metadata regarding the IR. In some embodiments, the memory may comprise instructions that when executed by the processor cause the processor to query the datastore to identify a set of users with complementary characteristics. In some such embodiments, the one or more characteristics of the user corresponding to the UIA may comprise one or more of a business unit, a user identification, and a status. In various embodiments, the memory may comprise instructions that when executed by the processor cause the processor to query the datastore to identify a set of IRs with complementary characteristics.

One or more embodiments described herein may include at least one non-transitory computer-readable medium comprising a set of instructions that, in response to being executed by a processor circuit, cause the processor circuit to perform operations comprising one or more of: identify collected metadata received from a user interface application (UIA) extension, the collected metadata based on an informational resource (IR) accessed by a UIA comprising the UIA extension; filter the collected metadata based on one or more settings of a data manager to create IR metadata; determine whether a datastore includes an existing IR data bucket corresponding to the IR accessed by the UIA; update contents of the existing IR data bucket with the IR metadata when the datastore includes the existing IR data bucket corresponding to the IR accessed by the UIA; create an IR data bucket corresponding to the IR accessed by the UIA when the datastore fails to include the existing IR data bucket corresponding to the IR accessed by the UIA; store the IR metadata in the IR data bucket created when the datastore fails to include an existing IR data bucket corresponding to the IR accessed by the UIA; identify another IR corresponding to another IR data bucket in the datastore correlated with the IR accessed by the UIA based on the IR metadata; and generate provided metadata for communication to the UIA extension, the provided metadata for communication to the UIA extension including an indication of the correlation between the IR and the other IR. In various embodiments, the UIA may comprise a web browser, the IR may comprise a website, and the collected metadata may indicate one or more interactions of the web browser with the website. Some embodiments may comprise instructions that, in response to being executed by the processor circuit, cause the processor circuit to: identify manual metadata received for the UIA extension, wherein the manual metadata includes information regarding the IR input by a user of the UIA; and filter the manual metadata and the collected metadata based on one or more settings of the data manager to create IR metadata. Many embodiments may comprise instructions that, in response to being executed by the processor circuit, cause the processor circuit to generate a metadata request for communication to the UIA extension based on the collected metadata, the metadata request to cause the UIA to prompt a user for manual metadata regarding the IR. Various embodiments may comprise instructions that, in response to being executed by the processor circuit, cause the processor circuit to store one or more characteristics of a user corresponding to the UIA in the IR data bucket corresponding to the IR accessed by the UIA. In various such embodiments, the one or more characteristics of the user corresponding to the UIA may comprise one or more of a business unit, a user identification, and a status. Several embodiments may comprise instructions that, in response to being executed by the processor circuit, cause the processor circuit to query the datastore to identify a set of users with complementary characteristics. Some embodiments may comprise instructions that, in response to being executed by the processor circuit, cause the processor circuit to query the datastore to identify a set of IRs with complementary characteristics.

Several embodiments described herein may include a computer-implemented method, comprising one or more of: receiving collected metadata from a user interface application (UIA) extension, the collected metadata based on an informational resource (IR) accessed by a UIA comprising the UIA extension and the collected metadata to indicate one or more activities of the UIA with respect to the IR; filtering the collected metadata based on one or more settings of a data manager to create IR metadata; determining an IR data bucket corresponding to the IR accessed by the UIA is absent from a datastore comprising a plurality of IR data buckets and each of the plurality of IR data buckets corresponding to a unique IR; creating the IR data bucket corresponding to the IR accessed by the UIA in the datastore based on absence of the IR data bucket corresponding to the IR from the datastore; storing at least a portion of the IR metadata in the IR data bucket corresponding to the IR; identifying one or more of the plurality of IR data buckets in the datastore correlated with the IR data bucket corresponding to the IR; and generating provided metadata for communication to the UIA extension, the provided metadata for communication to the UIA extension including an indication of the correlation between the IR data bucket and the one or more of the plurality of IR data buckets in the datastore. Various embodiments may comprise identifying manual metadata received for the UIA extension, wherein the manual metadata includes information regarding the IR input by a user of the UIA; and filtering the manual metadata and the collected metadata based on one or more settings of the data manager to create IR metadata. Some embodiments may comprise generating a metadata request for communication to the UIA extension based on the collected metadata, the metadata request to cause the UIA to prompt a user for manual metadata regarding the IR. Many embodiments may comprise querying the datastore to identify a set of users with complementary characteristics.

DETAILED DESCRIPTION

Figure 1:
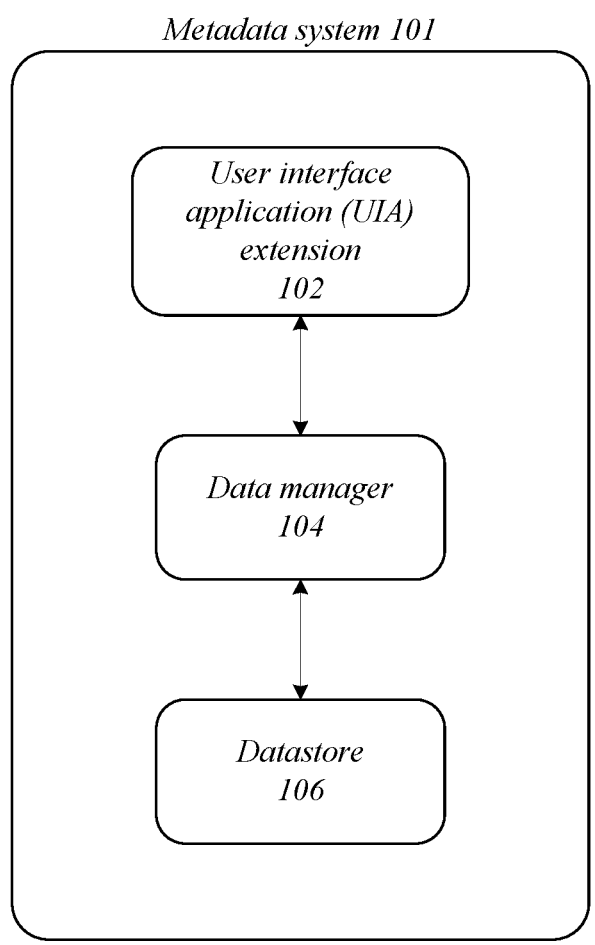
FIG. 1 illustrates an exemplary operating environment for a metadata system according to one or more embodiments described herein.

Various embodiments are generally directed to techniques for crowdsourcing metadata, such as to create, maintain, utilize, and/or communicate metadata in a datastore. Some embodiments are particularly directed to collecting, managing, and/or distributing metadata via a user interface application (UIA), or an extension thereof. Many embodiments may facilitate collaborative creation of a repository for metadata, such as notes, characteristics, and/or statistics corresponding to data viewed with the user interface application. For example, the comments regarding websites may be collected from a first user via a first instantiation of the web browser extension and distributed to a second user via a second instantiation of the web browser extension. In several embodiments, the metadata may be collected and managed with instantiations of the web browser extension (herein after "WBE instants") and a data manager may create, maintain, utilize, and/or communicate metadata in a datastore. These and other embodiments are described and claimed.

Some challenges facing metadata systems include rigid and ineffective devices and methods for collecting and managing metadata that result in metadata with limited usefulness. Additionally, oftentimes the metadata is difficult to access further reducing its usability. For example, physical access to the storage medium comprising the metadata may be required. Adding further complexity, the metadata may be collected by a plurality of independent agents using varying methods to collect different metadata for storage in inconsistent manners. These and other factors may result in metadata devices and methods with limited capabilities, resulting in reduced applicability, poor adaptability, and limited functionality. Such limitations can drastically reduce the quality and usability of metadata, contributing to missed opportunities, lost connections, limited collaboration, and repeated mistakes.

Various embodiments described herein include metadata systems, devices, and/or techniques for dynamic creation and distribution of metadata in an efficient and effective manner that promotes collaboration to increase the usefulness as well as utilization of metadata. In many embodiments, the metadata system may enable connections between disparate entities. Further, the metadata system may utilize the metadata to reduce duplicative efforts/errors. For example, connections between employees with common interests/issues, useful insights, and/or problems/solutions may be identified and promoted based on metadata. Many embodiments may include feedback mechanisms to identify relevant information and provide notifications. One or more techniques described herein may enable increased adaptability, usability, and effectiveness of metadata systems, leading to better functionality and increased capabilities. In these and other ways, components/techniques described herein may improve the creation and utilization of metadata, resulting in several technical effects and advantages over conventional computer technology, including increased capabilities and improved adaptability. In various embodiments, one or more of the aspects, techniques, and/or components described herein may be implemented in a practical application via one or more computing devices, and thereby provide additional and useful functionality to the one or more computing devices, resulting in more capable, better functioning, and improved computing devices. Further, one or more of the aspects, techniques, and/or components described herein may be utilized to improve one or more technical fields including enterprise systems, information distribution, metadata collection, metadata services, networking, and/or communications.

In several embodiments, components described herein may provide specific and particular manners to create, maintain, utilize, and/or communicate metadata. In several such embodiments, the specific and particular manners may include, for instance, one or more of receiving collected metadata from a user interface application (UIA) extension, the collected metadata based on an informational resource (IR) accessed by a UIA comprising the UIA application and the collected metadata to indicate one or more activities of the UIA with respect to the IR; filtering the collected metadata based on one or more settings of a data manager to create IR metadata; determining an IR data bucket corresponding to the IR accessed by the UIA is absent from a datastore comprising a plurality of IR data buckets and each of the plurality of IR data buckets corresponding to a unique IR; creating the IR data bucket corresponding to the IR accessed by the UIA in the datastore based on absence of the IR data bucket corresponding to the IR from the datastore; storing at least a portion of the IR metadata in the IR data bucket corresponding to the IR; identifying one or more of the plurality of IR data buckets in the datastore correlated with the IR data bucket corresponding to the IR; and generating provided metadata for communication to the UIA extension, the provided metadata for communication to the UIA extension including an indication of the correlation between the IR data bucket and the one or more of the plurality of IR data buckets in the datastore.

In many embodiments, one or more of the components described herein may be implemented as a set of rules that improve computer-related technology by allowing a function not previously performable by a computer that enables an improved technological result to be achieved. In several embodiments, the function allowed may include one or more aspects of collecting, analyzing, and disseminating metadata in a useful and efficient manner. For example, metadata may be interactively and dynamically collected. In another example, metadata may be analyzed to determine correlations between entities in a population. Further, the correlations may be communicated to the correlated entities. In yet another example, metadata may be analyzed to identify information and/or entities with knowledge that may assist in solving a problem.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an exemplary operating environment 100 for a metadata system 101 according to one or more embodiments described herein. The metadata system 101 of operating environment 100 may include a user interface application (UIA) extension 102, a data manager 104, and a datastore 106. In one or more embodiments described herein, the components of metadata system 101 may interoperate to perform one or more of the collection of useful metadata, analysis of the metadata, identification of relevant metadata, and communication of relevant metadata. Embodiments are not limited in this context.

In many embodiments, the UIA extension 102 may be an add-on to a UIA. In some embodiments, the UIA extension 102 may be a standalone application and/or include the UIA. The UIA may provide an interface through which a user may access/view data (e.g., informational resources). For example, the UIA may include a web browser. In various embodiments, the instantiations of the UIA extension 102 (hereinafter "extension instants") may collect and/or present metadata related to data accessed or viewed via the UIA. In several embodiments, extension instants may prompt a user to provide metadata. For instance, an extension instant may prompt a user to provide insights, tips, comments, rankings, and the like regarding data access or viewed, such as a website. In many embodiments, the UIA extension 102 may enable users to interact with the data manager 104. In some embodiments, the collection and/or presentation of metadata via extension instants may be administered, managed, and/or controlled by the data manager 104. In many embodiments, extension instants may automatically collect and/or communicate metadata to the data manager 104.

The data manager 104 may interact with a plurality of instantiations of UIA extension 102 (hereinafter "extension instants"). Further, the data manager 104 may store/retrieve metadata in datastore 106, such as based on interactions with extension instants. In various embodiments, data manager 104 may create and manage a structured database of metadata in datastore 106. In several embodiments, data manager 104 may analyze metadata in the datastore for classification, ranking, correlating, and/or improving contents of the datastore. For example, data manager 104 may identify needed metadata. In such examples, the data manager 104 may actively attempt to acquire the needed metadata, such as by prompting a user or querying a server.

In various embodiments, the data manager 104 may correlate metadata with other data, such as other metadata or other entities (e.g., users). For example, data manager 104 may identify one or more users with potentially relevant knowledge based on a correlation between metadata and the one or more users. In another example, a user may query the data manager 104 via the UIA extension 102 for metadata and/or users associated with an issue faced by the user. In many embodiments, data manager 104 may identify relevant metadata based on activity of the UIA as determined via communication with the UIA extension 102. For example, data manager 104 may provide website statistics (e.g., known traffic), insights, comments, and/or requests for metadata to an extension instant in response to the UIA accessing the website.

In one or more embodiments, the metadata system 101 may allow member users (e.g., employees) of a private network (e.g., an enterprise network) to add useful internal metadata to informational resources, such as websites. In various embodiments, the metadata may include one or more of a link to relevant internal pages (e.g., content management solutions (CMSs), source code management (SCM) pages, and the like), a link to relevant internal channels (e.g., messaging applications/services and the like), the number of other member users that have previously accessed an informational resource, comments, user activities, and insights. In some embodiments, the metadata may comprise file metadata that is set by an owner of the file, or the operating system. Further, the metadata may include things such as a last modified time and/or read/write/execute permissions. In several embodiments, users may set up notifications and/or reminders. For example, a user may choose to receive notification when other users add/update metadata. In some embodiments, feedback mechanisms may be incorporated, such as to allow content to be ranked and efficient identification of relevant information at the right time. In one embodiment, when a user accesses an informational resource that has associated metadata, the UIA extension 102 may provide a subtle notification that the user can select to reveal more information. For instance, an icon may change color or a popup notification including summary information may be provided as the subtle notification.

In many embodiments, data manager 104 may utilize metadata to determine characteristics/relationships of member users. In some embodiments, data manager 104 may generate an overview and/or structure of member users. In some such embodiments, data manager 104 may generate the overview and/or structure of member users based on the characteristics/relationships. In one embodiment, the one or more of the characteristics, relationships, overview, and structure of member users may be used to create groups. For example, a problem-solving task force may be created based on one or more of the characteristics, relationships, overview, and structure of member users.

As previously mentioned, the UIA extension 102 may be an add-on to a UIA. For example, users may download and install the UIA extension 102. In some such examples, the UIA extension 102 may be stored in datastore 106 and downloaded via the data manager 104. In many embodiments, an extension instant may come preinstalled on a computer. In several embodiments, extension instants (i.e., a UIA extension 102) may have multiple functional states. For example, extension instants may collect anonymous metadata in the background in a first state. In such examples, a user may register with or log in with the metadata system 101 to enable a second state. In the second state, collected metadata may be associated with the registered user.

In many embodiments, various aspects of the metadata system 101 may be anonymous. For example, the system could track one or more of the exact user that provided metadata (e.g., by having users register or use unique identifiers), a semi-anonymous identifier that could be used to verify which user provided the metadata (e.g., a hash of information provided by a user), or nothing that could be used to identify which user provided the metadata. In some embodiments, what, if anything, that is tracked by the system regarding users may be selectable/configurable by individual users and/or administrators.

Figure 2:
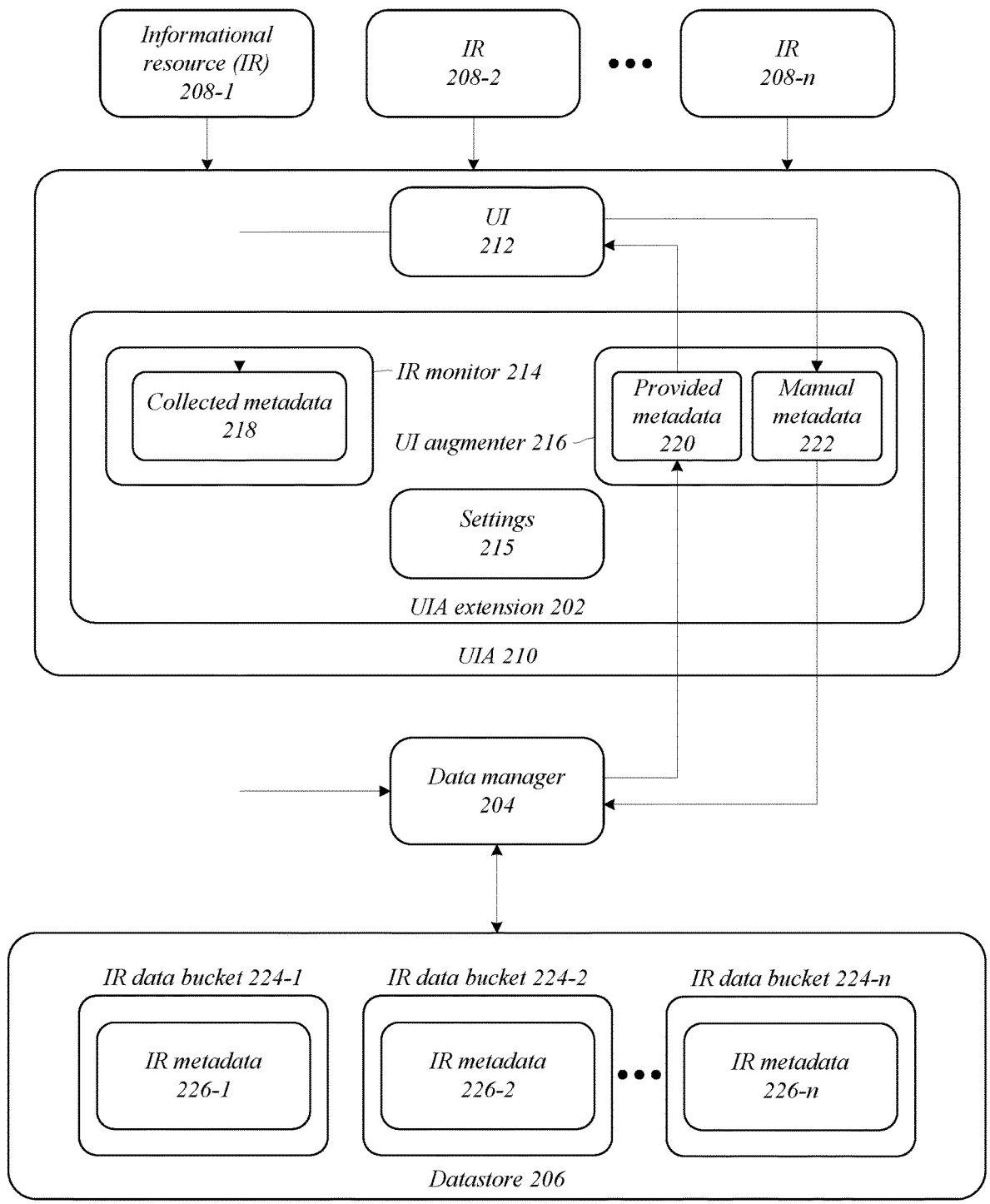
FIG. 2 illustrates various aspects of a metadata system according to one or more embodiments described herein.

FIG. 2 illustrates various aspects of a metadata system 201 in environment 200, according to one or more embodiments described herein. In some embodiments, environment 200 may include one or more components that are the same or similar to one or more other components described herein. For example, data manager 204 may be the same or similar to data manager 104. In environment 200, metadata system 201 may include one or more informational resources 208-1, 208-2, 208-n, a UIA 210, data manager 204, and datastore 206. In several embodiments, FIG. 2 may illustrate aspects of an exemplary process flow for providing and collecting metadata with metadata system 201. In the illustrated embodiment, UIA 210 may include a user interface (UI) 212 and a UIA extension 202. The UIA extension 202 may include an IR monitor 214 with collected metadata, a UI augmenter 216 with provided metadata 220 and manual metadata 222, and settings 215. Further, the datastore 206 may include one or more IR data buckets 224-1, 224-2, 224-n with IR metadata 226-1, 226-2, 226-n, respectively. Embodiments are not limited in this context.

In one or more embodiments, UIA 210 may be utilized to access the one or more IRs 208. When an IR is accessed via the UI 212 of UIA 210, the UIA extension 202 may utilize the IR monitor 214 to generate and/or retrieve collected metadata 218. In many embodiments, the generation and/or retrieval of collected metadata 218 may be performed automatically and/or in the background. Further, the UIA extension 202 may utilize the UI augmenter 216 to alter UI 212 to present provided metadata 220 and/or collect manual metadata 222. For example, UI augmenter 216 may generate a prompt in UI 212 requesting metadata, which may be provided as manual metadata 222. In another example, UI augmenter 216 may present provided metadata 220 on UI 212. In yet another example, IR monitor 214 may automatically generate collected metadata 218 based on interactions with UI 212, such as by logging key strokes. In some embodiments, one or more operational aspects of UIA extension 202 may be controlled based on settings 215. In some such embodiments, the settings 215 may be controlled by the user and/or data manager 204.

In various embodiments, data manager 204 may utilize collected metadata 218 and/or manual metadata 222 to generate IR metadata in a corresponding IR data bucket. In several embodiments, data manager 204 may select metadata from datastore 206 to provide to a user via UI 212 as provided metadata based on one or more of the collected metadata 218 and manual metadata 222. In many embodiments, data manager 204 may utilize collected metadata 218 and/or datastore 206 to identified needed metadata. In many such embodiments, data manager 204 may cause UIA extension 202 to request the metadata to be input via the UI 212 as manual metadata. In some embodiments, manual metadata 222 may be provided via UI 212 without prompting by UIA extension 202. For example, a user may decide to provide comments, tips, and/or insights as manual metadata 222.

In several embodiments, each IR data bucket 224 may correspond to a unique informational resource (e.g., a website). For instance, IR 208-1 may correspond to UR data bucket 224-1, IR 208-2 may correspond to IR data bucket 224-2, and IR 208-3 may correspond to IR data bucket 224-3. In many embodiments, if an IR is accessed that does not have a corresponding IR data bucket, then a corresponding IR data bucket is generated in datastore 206. In some embodiments, additionally, or alternatively, datastore 206 may include user data buckets for storing metadata associated with each user. In one or more embodiments, each IR data bucket may serve as repositories for the corresponding IR. These repositories may include information associated with the corresponding IR including one or more of metadata, metadata of metadata, correlations, associated entities, statistics, tips, comments, links, and contacts.

Figure 3:
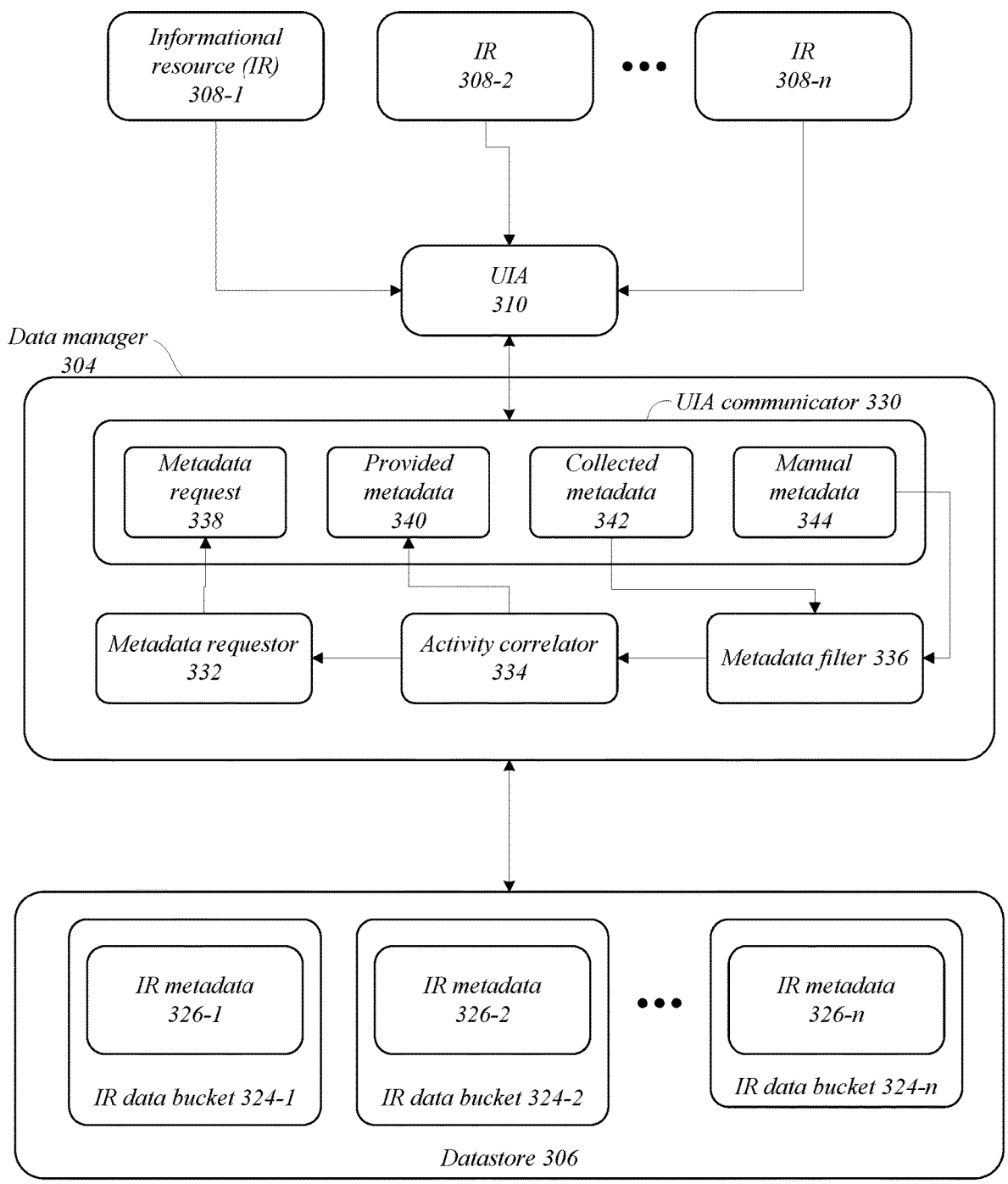
FIG. 3 illustrates various aspects of a metadata system according to one or more embodiments described herein.

FIG. 3 illustrates various aspects of a metadata system 301 in environment 300, according to one or more embodiments described herein. In some embodiments, environment 300 may include one or more components that are the same or similar to one or more other components described herein. For example, data manager 304 may be the same or similar to data manager 104. In environment 300, metadata system 301 may include one or more informational resources 308-1, 308-2, 308-n, UIA 310, data manager 304, and datastore 306. In several embodiments, FIG. 3 may illustrate aspects of an exemplary process flow for determining metadata to provide/collect via UIA 310. In the illustrated embodiment, data manager 304 may include a UIA communicator 330, a metadata requestor 332, an activity correlator 334, and a metadata filter 336. The UIA communicator 330 may include metadata request 338, provided metadata 340, collected metadata 342, and manual metadata 344. Further, the datastore 306 may include one or more IR data buckets 324-1, 324-2, 324-n with IR metadata 326-1, 326-2, 326-n, respectively. Embodiments are not limited in this context.

UIA communicator 330 may be utilized by data manager 304 to communicate and interact with UIA 310. In some embodiments, UIA communicator 330 may include an application programming interface (API). In many embodiments, data manager 304 may determine metadata to collect via and/or provide to UIA 310. For example, collected metadata 342 and/or manual metadata 344 may be received from UIA 310. Metadata filter 336 may then sort/parse/format the collected and/or manual metadata into data for correlation and/or storage in datastore 306 (e.g., website identifier, user identifier, etc.). Activity correlator 334 may then interact with datastore 306 to determine relevant metadata in datastore 306 and/or metadata needed for datastore 306. The relevant metadata in datastore 306 may then be communicated to UIA 310 via UIA communicator 330 as provided metadata 340. Additionally, or alternatively, needed metadata may be passed to metadata requestor 332. Metadata requestor 332 may generated metadata request 338 for communication to UIA 310 via UIA communicator 330 as metadata request 338. In several embodiments, UIA may receive one or more portions of manual metadata 344 in response to the metadata request 338.

Figure 4:
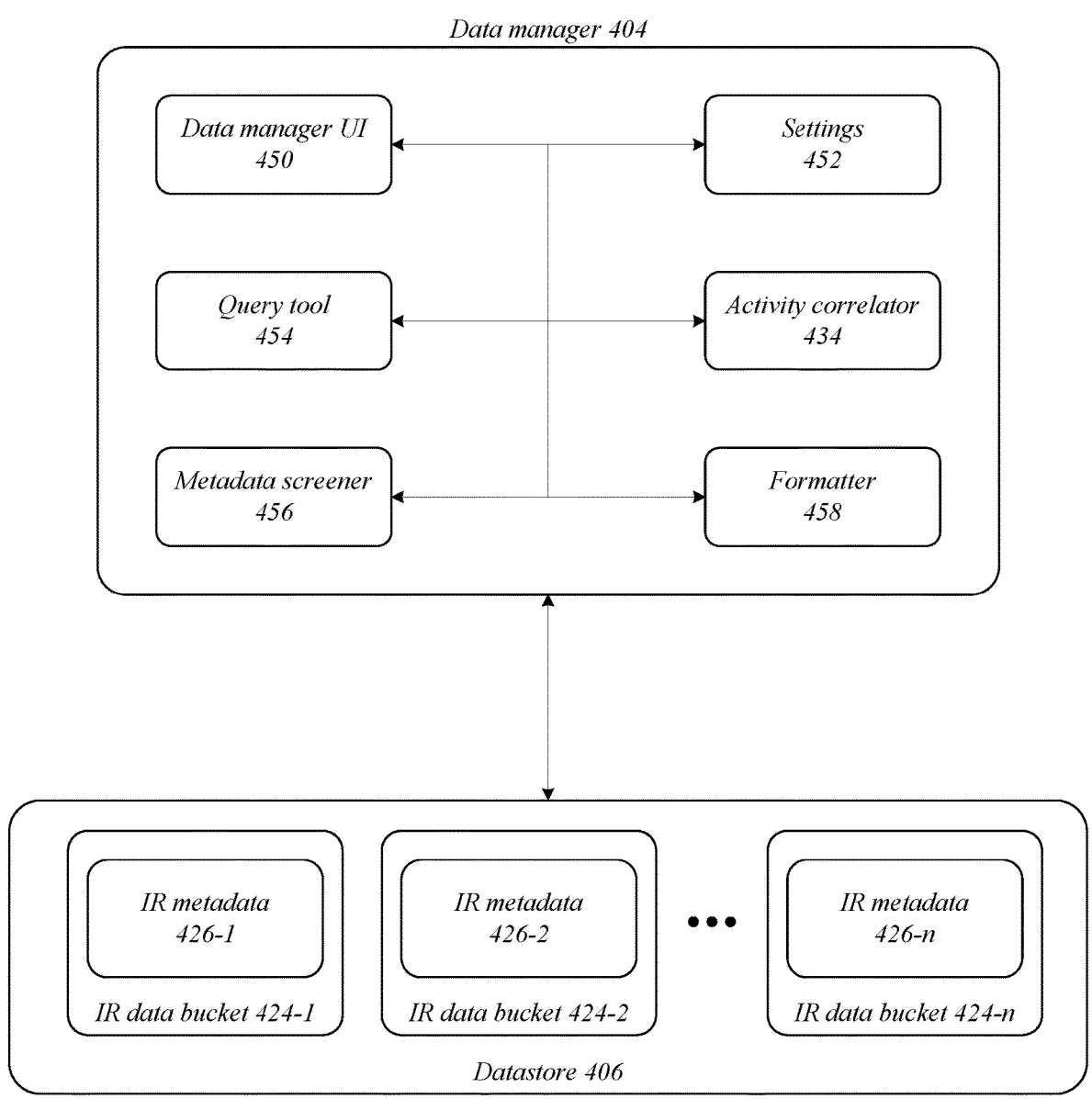
FIG. 4 illustrates exemplary aspects of interactions between a data manager and a datastore in a metadata system according to one or more embodiments described herein.

FIG. 4 illustrates various aspects of interactions between a data manager 404 and datastore 406 in metadata system 401 of environment 400, according to one or more embodiments described herein. In some embodiments, environment 400 may include one or more components that are the same or similar to one or more other components described herein. For example, data manager 404 may be the same or similar to data manager 104. In environment 400, metadata system 401 may include data manager 404 and datastore 406. In several embodiments, FIG. 4 may illustrate aspects of an exemplary process flow for utilizing metadata in datastore 406 to determine connections between users with common interests/issues, useful insights, and/or problems/solutions. In the illustrated embodiment, metadata system 401 may include data manager 404 and datastore 406. Data manager 404 may include a data manager UI 450, query tool 454, metadata screener 456, settings 452, activity correlator 434, and formatter 458. Further, the datastore 406 may include one or more IR data buckets 424-1, 424-2, 424-n with IR metadata 426-1, 426-2, 426-n, respectively. Embodiments are not limited in this context.

In some embodiments, data manager 404 may be accessed via data manager UI 450. In some such embodiments, accessing data manager 404 via data manager UI 450 may provide additional functionality that is not available via the UIA extension. In other such embodiments, accessing data manager 404 via data manager UI 450 may provide the same functionality available via the UIA extension. In various embodiments, the UIA extension may access data manager 404 via data manager UI 450. In various such embodiments, the data manager UI 450 may include an API. In many embodiments, settings 452 may be selected/provided via data manager UI 450.

The query tool 454 may enable data manager 404 to search datastore 406 based on one or more characteristics, such as user or metadata characteristics. For example, query tool 454 may enable datastore 406 to be searched for metadata and/or users associated with a particular technology, issue, and/or interest. In various embodiments, metadata screener 456 may enable data manager 404 to screen data in datastore 406 according to identified traits. In many embodiments, activity correlator 434 may identify relationships between metadata and/or users. In some embodiments, activity correlator 434 may be used in conjunction with query tool 454 and/or metadata screener 456. In one or more embodiments, formatter 458 may condition data for presentation, storage, and/or communication. For example, formatter 458 may arrange results of a query or screen based on settings 452. In another example, formatter 458 may index data for storage in datastore 406.

Figure 5A:
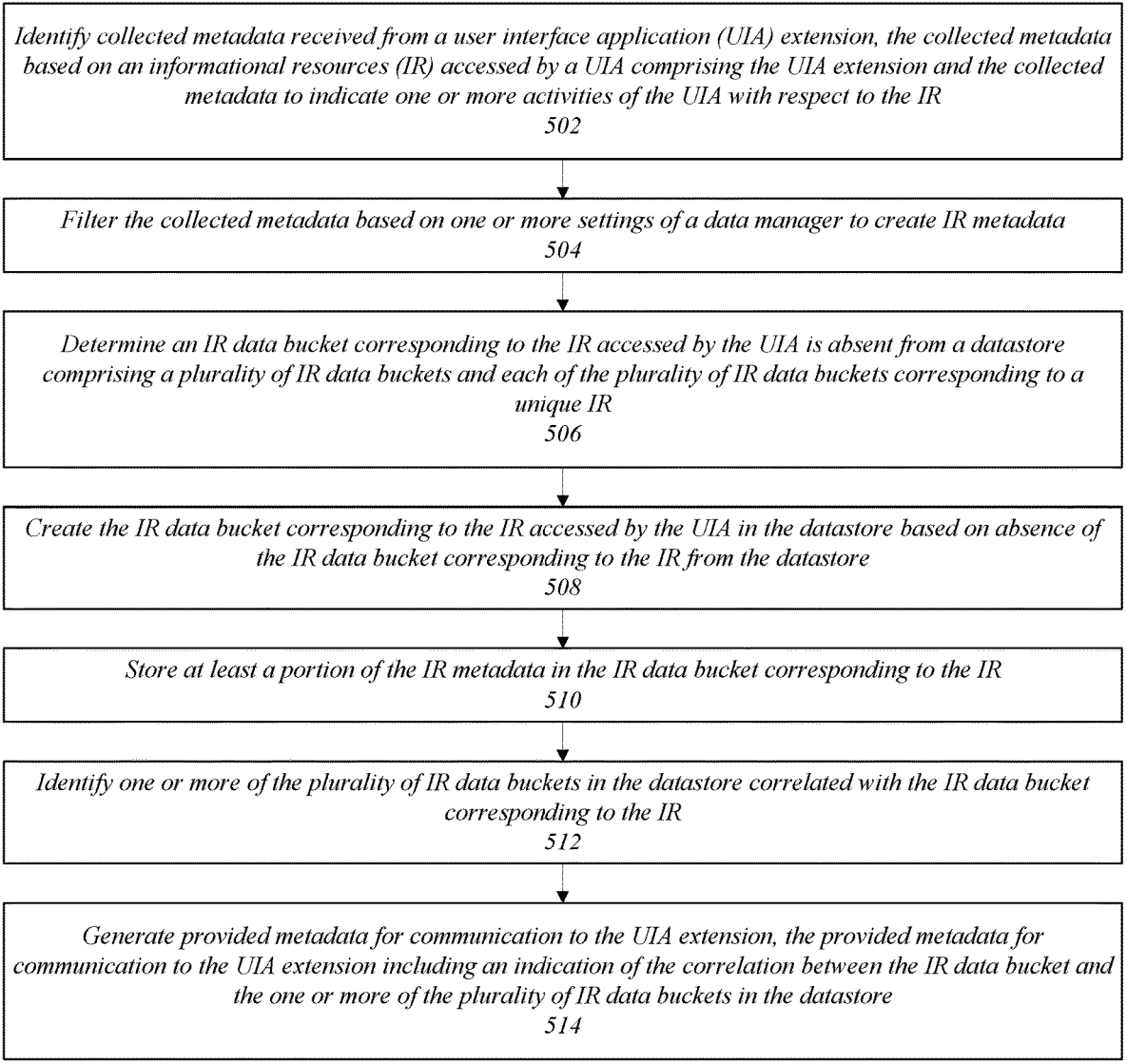
FIG. 5A illustrates a first exemplary logic flow according to one or more embodiments described herein.

FIG. 5A illustrates one embodiment of a logic flow 500A, which may be representative of operations that may be executed in various embodiments in conjunction with techniques for collecting, managing, and/or distributing metadata. The logic flow 500A may be representative of some or all of the operations that may be executed by one or more components/devices/environments described herein, such as UIA extension 102, data manager 104, and/or datastore 106 of metadata system 101. The embodiments are not limited in this context.

In the illustrated embodiments, logic flow 500A may begin at block 502. At block 502 "identify collected metadata received from a user interface application (UIA) extension, the collected metadata based on an informational resource (IR) accessed by a UIA comprising the UIA application and the collected metadata to indicate one or more activities of the UIA with respect to the IR" collected metadata received from a UIA may be identified. Further, the collected metadata may be based on an IR accessed by a UIA comprising the UIA extension and the collected metadata may indicate one or more activities of the UIA with respect to the IR. For example, data manager 204 may identify collected metadata 218 received from UI 212 of UIA 210 based on access to IR 208-1. In such examples, collected metadata 218 may indicate one or more activities of the UIA 210 with respect to IR 208-1.

Continuing to block 504 "filter the collected metadata based on one or more settings of a data manager to create IR metadata" the collected metadata may be filtered based on one or more settings of a data manager. For instance, metadata filter 336 of data manager 304 may filter collected metadata 342 based on one or more of settings 215. Continuing to block 506 "determine an IR data bucket corresponding to the IR accessed by the UIA is absent from a datastore comprising a plurality of IR data buckets and each of the plurality of IR data buckets corresponding to a unique IR" the absence of an IR data bucket corresponding to the IR accessed by the UIA in a datastore comprising a plurality of IR data buckets corresponding to unique IRs. For example, data manager 304 may determine datastore 306 does not include an IR data bucket corresponding to IR 308-n.

At block 508 "create the IR data bucket corresponding to the IR accessed by the UIA in the datastore based on absence of the IR data bucket corresponding to the IR from the datastore" the absent IR bucket corresponding to the IR accessed by the UIA may be created in the datastore. For instance, data manager 304 may create IR data bucket 324-n in datastore 306 based on the absence of an IR data bucket corresponding to IR 308-n. Continuing to block 510 "store at least a portion of the IR metadata in the IR data bucket corresponding to the IR" at least a portion of the IR metadata is stored in the corresponding IR data bucket. For instance, IR metadata 326-n may be stored in IR data bucket 324-n.

Proceeding to block 512 "identify one or more of the plurality of IR data buckets in the datastore correlated with the IR data bucket corresponding to the IR" one or more of the IR data buckets in the datastore may be identified as correlated with the IR data bucket corresponding to the IR. For example, activity correlator 434 of data manager 404 may identify IR data bucket 424-1 as correlated with IR data bucket 424-n and thus a correlation between different IRs. At block 514 "generate provided metadata for communication to the UIA extension, the provided metadata for communication to the UIA extension including an indication of the correlation between the IR data bucket and the one or more of the plurality of IR data buckets in the datastore" provided metadata for communication to the UIA extension including an indication of the correlation between the IR data bucket and the one or more of the plurality of IR data buckets in the datastore may be generated. For instance, activity correlator 334 may generate provided metadata 340 for communication to UIA 310 with UIA communicator 330. In such instances, the provided metadata 340 may include an indication of a correlation between IR data bucket 324-1 and IR data bucket 324-n.

Figure 5B:
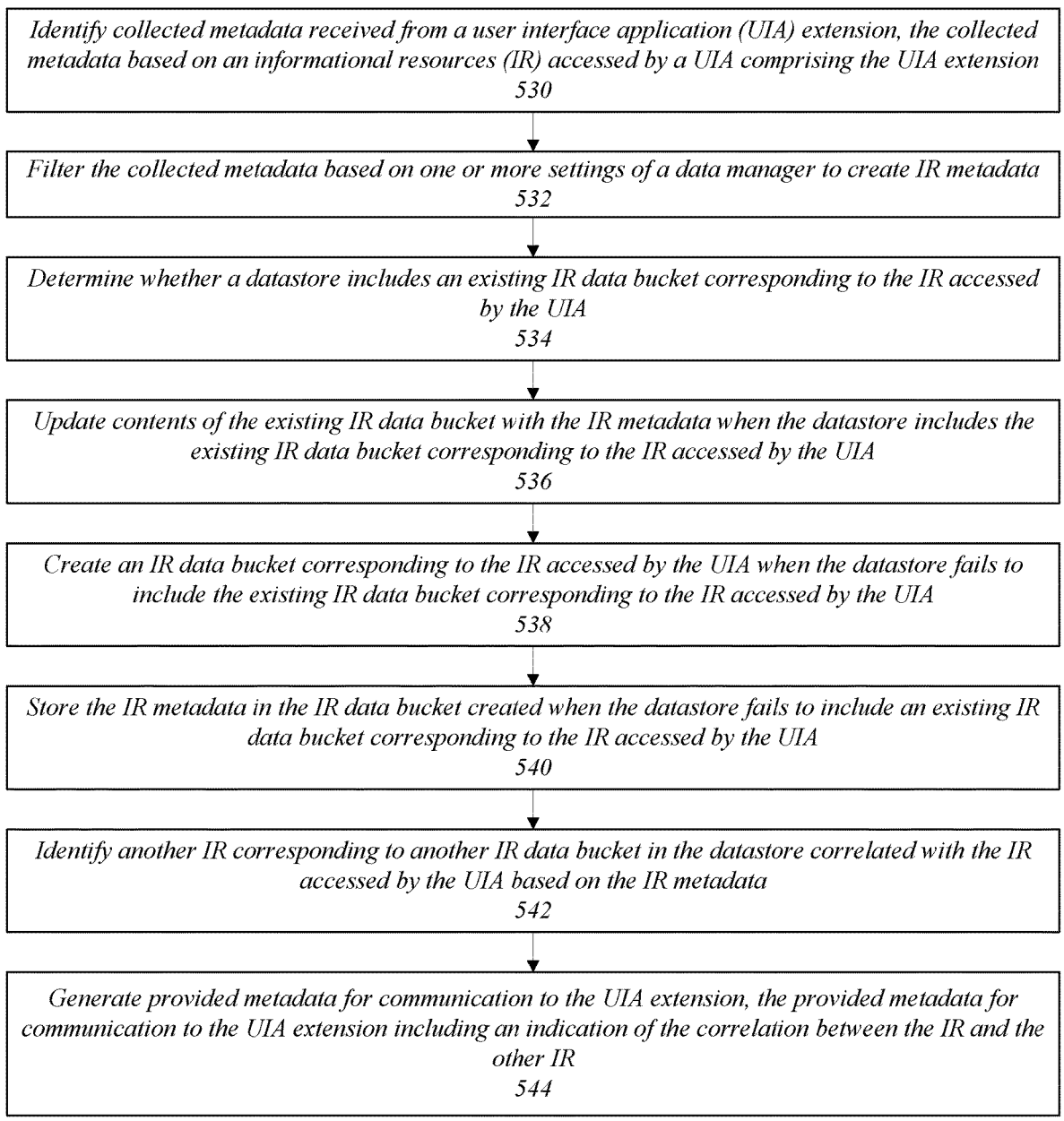
FIG. 5B illustrates a second exemplary logic flow according to one or more embodiments described herein.

FIG. 5B illustrates one embodiment of a logic flow 500B, which may be representative of operations that may be executed in various embodiments in conjunction with techniques for collecting, managing, and/or distributing metadata. The logic flow 500B may be representative of some or all of the operations that may be executed by one or more components/devices/environments described herein, such as UIA extension 102, data manager 104, and/or datastore 106 of metadata system 101. The embodiments are not limited in this context.

In the illustrated embodiments, logic flow 500B may begin at block 530. At block 530 "identify collected metadata received from a user interface application (UIA) extension, the collected metadata based on an informational resource (IR) accessed by a UIA comprising the UIA extension and the collected metadata to indicate one or more activities of the UIA with respect to the IR" collected metadata received from a UIA may be identified. Further, the collected metadata may be based on an IR accessed by a UIA comprising the UIA extension. For example, data manager 204 may identify collected metadata 218 received from UI 212 of UIA 210 based on access to IR 208-2.

Continuing to block 532 "filter the collected metadata based on one or more settings of a data manager to create IR metadata" the collected metadata may be filtered based on one or more settings of a data manager. For instance, metadata filter 336 of data manager 304 may filter collected metadata 342 based on one or more of settings 215. Continuing to block 534 "determine whether a datastore includes an existing IR data bucket corresponding to the IR accessed by the UIA" whether an IR data bucket in a datastore comprising a plurality of IR data buckets corresponds to the IR accessed by the UIA. For example, data manager 304 may determine whether datastore 306 includes an IR data bucket corresponding to IR 308-n.

At block 536 "update contents of the existing IR data bucket with the IR metadata when the datastore includes the existing IR data bucket corresponding to the IR accessed by the UIA" contents of the corresponding IR data bucket may be updated when the corresponding IR data bucket exists in the datastore. For example, data manager 304 may update IR data bucket 324-1 with replacement and/or additional IR metadata 326-1 based on IT data bucket 324-1 corresponding with IR 308-1 accessed by UIA 310. Proceeding to block 538 "create an IR data bucket corresponding to the IR accessed by the UIA when the datastore fails to include the existing IR data bucket corresponding to the IR accessed by the UIA" the absent IR bucket corresponding to the IR accessed by the UIA may be created in the datastore. For instance, data manager 304 may create IR data bucket 324-n in datastore 306 based on the absence of an IR data bucket corresponding to IR 308-n.

Continuing to block 540 "store the IR metadata in the IR data bucket created when the datastore fails to include an existing IR data bucket corresponding to the IR accessed by the UIA" at least a portion of the IR metadata is stored in the corresponding IR data bucket. For instance, IR metadata 326-n may be stored in IR data bucket 324-n. At block 542 "identify another IR corresponding to another IR data bucket in the datastore correlated with the IR accessed by the UIA based on the IR metadata" one or more of the IR data buckets in the datastore may be identified as correlated with the IR data bucket corresponding to the IR. For example, activity correlator 434 of data manager 404 may identify IR data bucket 424-1 as correlated with IR data bucket 424-n and thus a correlation between different IRs.

At block 544 "generate provided metadata for communication to the UIA extension, the provided metadata for communication to the UIA extension including an indication of the correlation between the IR and the other IR" provided metadata for communication to the UIA extension including an indication of the correlation between the IR data bucket and the one or more of the plurality of IR data buckets in the datastore may be generated. For instance, activity correlator 334 may generate provided metadata 340 for communication to UIA 310 with UIA communicator 330. In such instances, the provided metadata 340 may include an indication of a correlation between IR data bucket 324-1 and IR data bucket 324-*n*.

Figure 5C:
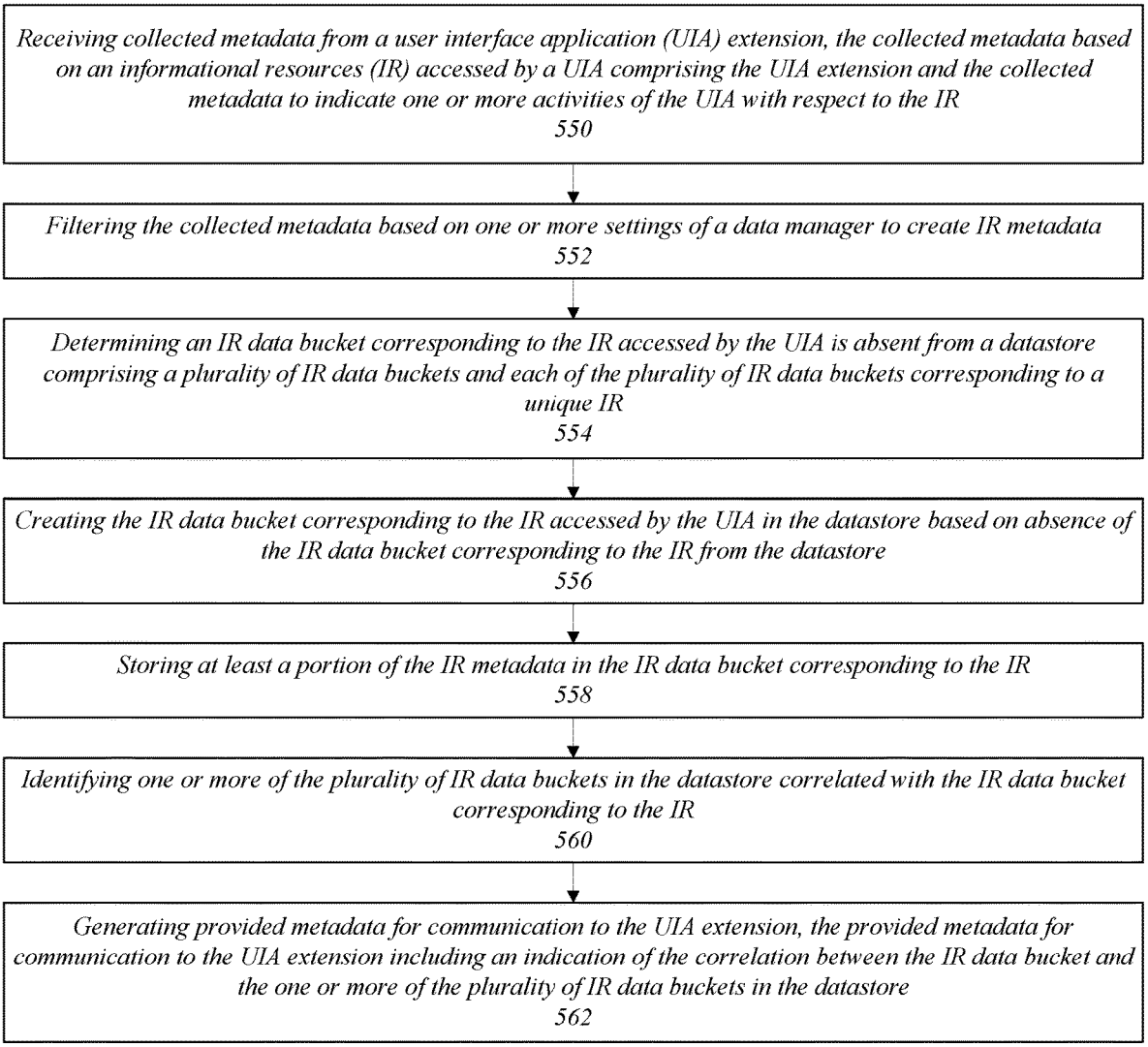
FIG. 5C illustrates a third exemplary logic flow according to one or more embodiments described herein.

FIG. 5C illustrates one embodiment of a logic flow 500A, which may be representative of operations that may be executed in various embodiments in conjunction with techniques for collecting, managing, and/or distributing metadata. The logic flow 500A may be representative of some or all of the operations that may be executed by one or more components/devices/environments described herein, such as UIA extension 102, data manager 104, and/or datastore 106 of metadata system 101. The embodiments are not limited in this context.

In the illustrated embodiments, logic flow 500A may begin at block 550. At block 550 "receiving collected metadata received from a user interface application (UIA) extension, the collected metadata based on an informational resource (IR) accessed by a UIA comprising the UIA application and the collected metadata to indicate one or more activities of the UIA with respect to the IR" collected metadata received from a UIA may be identified. Further, the collected metadata may be based on an IR accessed by a UIA comprising the UIA extension and the collected metadata may indicate one or more activities of the UIA with respect to the IR. For example, data manager 204 may identify collected metadata 218 received from UI 212 of UIA 210 based on access to IR 208-1. In such examples, collected metadata 218 may indicate one or more activities of the UIA 210 with respect to IR 208-1.

Continuing to block 552 "filtering the collected metadata based on one or more settings of a data manager to create IR metadata" the collected metadata may be filtered based on one or more settings of a data manager. For instance, metadata filter 336 of data manager 304 may filter collected metadata 342 based on one or more of settings 215. Continuing to block 554 "determining an IR data bucket corresponding to the IR accessed by the UIA is absent from a datastore comprising a plurality of IR data buckets and each of the plurality of IR data buckets corresponding to a unique IR" the absence of an IR data bucket corresponding to the IR accessed by the UIA in a datastore comprising a plurality of IR data buckets corresponding to unique IRs. For example, data manager 304 may determine datastore 306 does not include an IR data bucket corresponding to IR 308-*n*.

At block 556 "creating the IR data bucket corresponding to the IR accessed by the UIA in the datastore based on absence of the IR data bucket corresponding to the IR from the datastore" the absent IR bucket corresponding to the IR accessed by the UIA may be created in the datastore. For instance, data manager 304 may create IR data bucket 324-*n* in datastore 306 based on the absence of an IR data bucket corresponding to IR 308-*n*. Continuing to block 558 "storing at least a portion of the IR metadata in the IR data bucket corresponding to the IR" at least a portion of the IR metadata is stored in the corresponding IR data bucket. For instance, IR metadata 326-*n* may be stored in IR data bucket 324-*n*.

Proceeding to block 560 "identifying one or more of the plurality of IR data buckets in the datastore correlated with the IR data bucket corresponding to the IR" one or more of the IR data buckets in the datastore may be identified as correlated with the IR data bucket corresponding to the IR. For example, activity correlator 434 of data manager 404 may identify IR data bucket 424-1 as correlated with IR data bucket 424-*n* and thus a correlation between different IRs. At block 562 "generating provided metadata for communication to the UIA extension, the provided metadata for communication to the UIA extension including an indication of the correlation between the IR data bucket and the one or more of the plurality of IR data buckets in the datastore" provided metadata for communication to the UIA extension including an indication of the correlation between the IR data bucket and the one or more of the plurality of IR data buckets in the datastore may be generated. For instance, activity correlator 334 may generate provided metadata 340 for communication to UIA 310 with UIA communicator 330. In such instances, the provided metadata 340 may include an indication of a correlation between IR data bucket 324-1 and IR data bucket 324-*n*.

Figure 6:
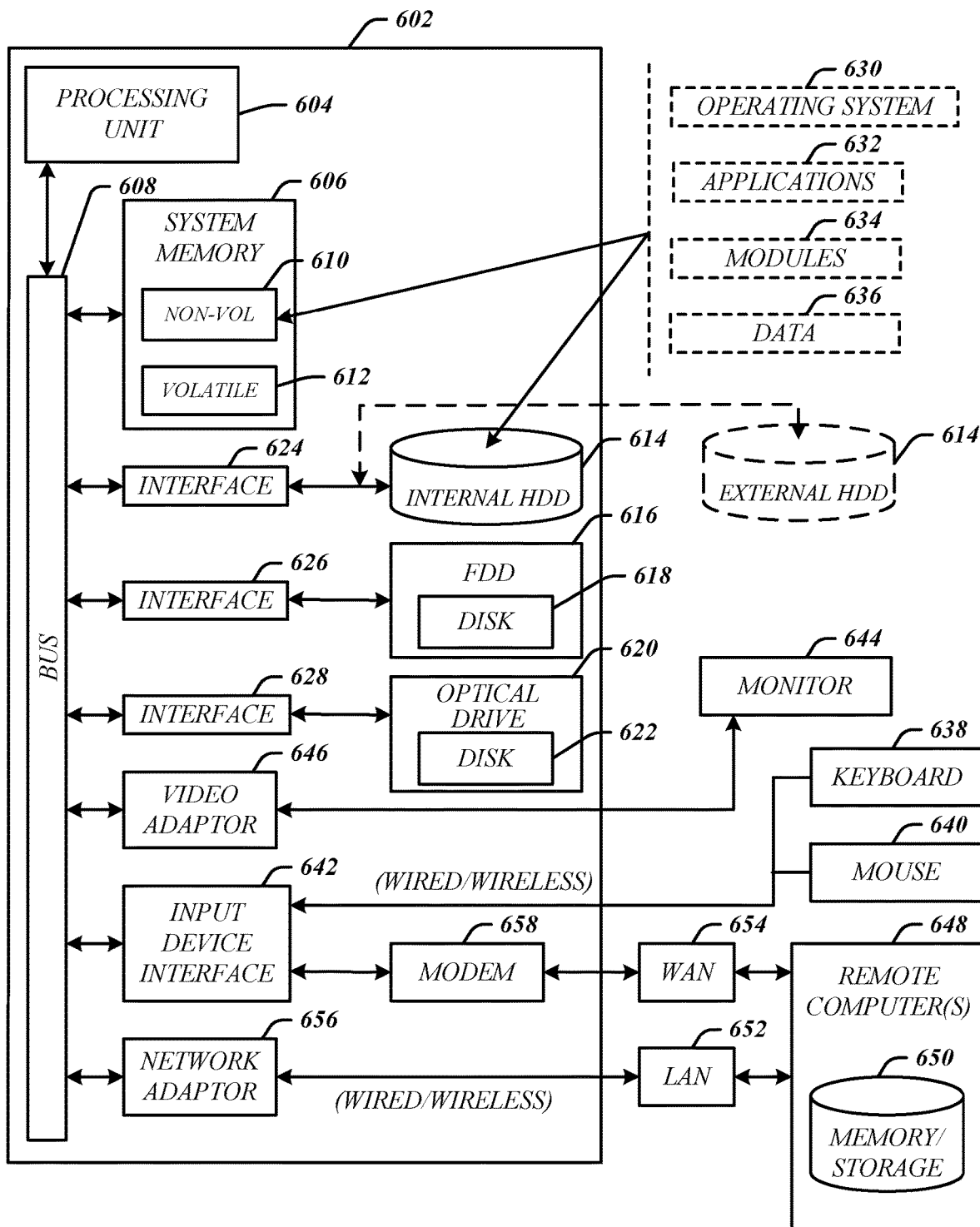
FIG. 6 illustrates exemplary aspects of a computing architecture according to one or more embodiments described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of one or more components described herein. In some embodiments, computing architecture 600 may be representative, for example, of a computing device that implements or utilizes one or more portions of components and/or techniques described herein, such as metadata system 101. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. In some embodiments, system memory 606 may include main memory. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include or implement, for example, the various techniques, applications, and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608 but can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, one or more interactions described herein may occur via the networked environment. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
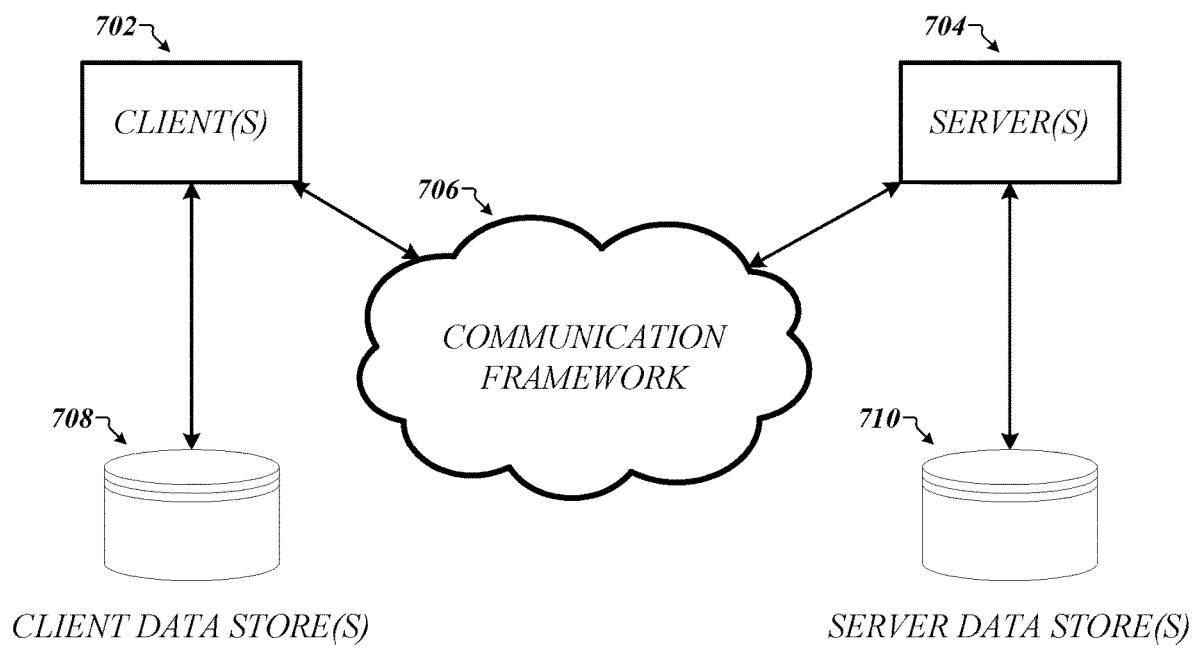
FIG. 7 illustrates exemplary aspects of a communications architecture according to one or more embodiments described herein.

FIG. 7 illustrates a block diagram of an exemplary communications architecture 700 suitable for implementing various embodiments, techniques, interactions, and/or components described herein, such as metadata system 101. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments, communications architecture may include or implement one or more portions of components, applications, and/or techniques described herein. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described herein, such as in conjunction with storage of data received from any one of clients 702 on any of server data stores 710. In one or more embodiments, one or more of client data store(s) 708 or server data store(s) 710 may include memory accessible to one or more portions of components, applications, and/or techniques described herein.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The invention claimed is:

1. An apparatus, comprising:
a processor; and
memory comprising instructions that when executed by the processor cause the processor to:
determine a population of member users for a user interface application (UIA) configured to access informational resources (IRs), the UIA associated with a UIA extension, each of the population of member users associated with one of a plurality of UIA extension instances when interacting with the UIA;
generate metadata via the plurality of UIA extension instances responsive to the population of member users accessing the IRs via the UIA;
correlate the metadata with corresponding member users of the population of member users;
determine at least one characteristic of each of the population of member users based on the metadata, wherein the processor is configured to generate an overview of the population of member users based on the at least one characteristics;
determine an issue associated with one of the population of member users;
determine at least one of the population of member users with knowledge relevant to the issue based on the at least one characteristic and the overview; and
provide a notification on the UIA when the determined at least one of the population of member users with knowledge relevant to the issue adds or updates metadata by interacting with the IRs via the UIA for an issue on which the at least one of the population of member users is knowledgeable.

2. The apparatus of claim 1, the UIA comprising a web browser, the IR comprising a website, the UIA extension being a browser extension of the web browser, and the metadata configured to indicate one or more interactions of the web browser with the website;
wherein each of the plurality of UIA extension instances has multiple functional states, including a first state wherein a corresponding UIA extension collects anonymous metadata in a background process of the apparatus and a second state wherein the corresponding UIA extension collects metadata and associates the metadata with a corresponding member user if the member user is registered with the apparatus to associated the metadata with the corresponding member user.

3. The apparatus of claim 1, the at least one characteristic of the population of member users comprising one or more of a business unit, a user identification, and a status.

4. The apparatus of claim 1, the at least one characteristic of the population of member users comprising an association with one or more of a particular technology, an issue, and/or an interest.

5. The apparatus of claim 1, the instructions, when executed by the processor, to cause the processor to determine at least one relationship between at least two of the population of member users based on the at least one characteristic.

6. The apparatus of claim 5, the instructions, when executed by the processor, to cause the processor to generate a structure of at least a portion of the population of member users based on at least one of the at least one characteristic or the at least one relationship.

7. The apparatus of claim 1, the instructions, when executed by the processor, to cause the processor to determine a problem-solving group of users from the population of member users based on the at least one characteristic.

8. At least one non-transitory computer-readable medium comprising a set of instructions that, in response to being executed by a processor circuit, cause the processor circuit to:
determine a population of member users for a user interface application (UIA) configured to access informational resources (IRs), the UIA associated with a UIA extension, each of the population of member users associated with one of a plurality of UIA extension instances when interacting with the UIA;
generate metadata via the plurality of UIA extension instances responsive to the population of member users accessing the IRs via the UIA;
correlate the metadata with corresponding member users of the population of member users;
determine at least one characteristic of each of the population of member users based on the metadata, wherein the processor is configured to generate an overview of the population of member users based on the at least one characteristics;
determine an issue associated with one of the population of member users;
determine at least one of the population of member users with knowledge relevant to the issue based on the at least one characteristic and the overview; and
provide a notification on the UIA when the determined at least one of the population of member users with knowledge relevant to the issue adds or updates metadata by interacting with the IRs via the UIA for an issue on which the at least one of the population of member users is knowledgeable.

9. The at least one non-transitory computer-readable medium of claim 8, the UIA comprising a web browser, the IR comprising a website, the UIA extension being a browser extension of the web browser, and the metadata configured to indicate one or more interactions of the web browser with the website;
wherein each of the plurality of UIA extension instances has multiple functional states, including a first state wherein a corresponding UIA extension collects anonymous metadata in a background process of the apparatus and a second state wherein the corresponding UIA extension collects metadata and associates the metadata with a corresponding member user if the member user is registered with the apparatus to associated the metadata with the corresponding member user.

10. The at least one non-transitory computer-readable medium of claim 8, the at least one characteristic of the population of member users comprising one or more of a business unit, a user identification, and a status.

11. The at least one non-transitory computer-readable medium of claim 8, the at least one characteristic of the population of member users comprising an association with one or more of a particular technology, an issue, and/or an interest.

12. The at least one non-transitory computer-readable medium of claim 8, the instructions, when executed by the processor, to cause the processor to determine at least one relationship between at least two of the population of member users based on the at least one characteristic.

13. The at least one non-transitory computer-readable medium of claim 12, the instructions, when executed by the processor, to cause the processor to generate a structure of at least a portion of the population of member users based on at least one of the at least one characteristic or the at least one relationship.

14. The at least one non-transitory computer-readable medium of claim 8, the instructions, when executed by the processor, to cause the processor to determine a problem-solving group of users from the population of member users based on the at least one characteristic.

15. A computer-implemented method, comprising:
determining a population of member users for a user interface application (UIA) configured to access informational resources (IRs), the UIA associated with a UIA extension, each of the population of member users associated with one of a plurality of UIA extension instances when interacting with the UIA;
generating metadata via the plurality of UIA extension instances responsive to the population of member users accessing the IRs via the UIA;
correlating the metadata with corresponding member users of the population of member users;
determining at least one characteristic of each of the population of member users based on the metadata, wherein the processor is configured to generate an overview of the population of member users based on the at least one characteristics;
determining an issue associated with one of the population of member users;
determining at least one of the population of member users with knowledge relevant to the issue based on the at least one characteristic and the overview; and
providing a notification on the UIA when the determined at least one of the population of member users with knowledge relevant to the issue adds or updates metadata by interacting with the IRs via the UIA for an issue on which the at least one of the population of member users is knowledgeable.

16. The computer-implemented method of claim 15, the UIA comprising a web browser, the IR comprising a website, the UIA extension being a browser extension of the web browser, and the metadata configured to indicate one or more interactions of the web browser with the website;
wherein each of the plurality of UIA extension instances has multiple functional states, including a first state wherein a corresponding UIA extension collects anonymous metadata in a background process of the apparatus and a second state wherein the corresponding UIA extension collects metadata and associates the metadata with a corresponding member user if the member user is registered with the apparatus to associated the metadata with the corresponding member user.

17. The computer-implemented method of claim 15, the at least one characteristic of the population of member users comprising one or more of a business unit, a user identification, and a status.

18. The computer-implemented method of claim 15, the at least one characteristic of the population of member users comprising an association with one or more of a particular technology, an issue, and/or an interest.

19. The computer-implemented method of claim 15, the instructions, when executed by the processor, to cause the processor to determine at least one relationship between at least two of the population of member users based on the at least one characteristic.

20. The computer-implemented method of claim 15, the instructions, when executed by the processor, to cause the processor to determine a problem-solving group of users from the population of member users based on the at least one characteristic.

* * * * *